Oct. 1, 1935.  J. W. VEDDER  2,015,770

FITTING GEAR FOR COLOR PRINTING MACHINES

Original Filed Oct. 31, 1932

Inventor
John Warren Vedder
By Attorneys

Patented Oct. 1, 1935

2,015,770

UNITED STATES PATENT OFFICE 2,015,770

FITTING GEAR FOR COLOR PRINTING MACHINES

John Warren Vedder, Worcester, Mass., assignor to Rice, Barton & Fales, Incorporated, Worcester, Mass., a corporation of Massachusetts Application October 31, 1932, Serial No. 640,515
Renewed July 31, 1935

2 Claims. (Cl. 74—395)

This invention relates to fitting gears for use on the color rolls of color printing machines and in similar locations. This gear is sometimes referred to as a box gear.

The principal objects of this invention are to provide a gear guard to protect the operator without increasing the number of parts of the assembly; to provide an integral gear guard which rotates with the gear; to provide a location for the guard of such a nature that the holes for use in attaching the worm operating mechanism do not underlie the teeth; to provide an additional safety feature due to the fact that the worm operating mechanism is located further away than heretofore from the nip of the gear teeth; to provide a construction in which the number of teeth in the fitting gear can be reduced if so desired to a minimum which is now not possible, in which the method of handling the fitting gear both for putting it on and taking it off is simplified, in which the design lends itself readily to the guarding of the nip of the gear, and by which the area of the journals of the worm with which the gear is provided can be increased, which has been impossible heretofore, thus making easier operating conditions; to provide a construction in which the lubrication of the sleeve or quill can be provided for readily, and to provide a construction in which friction rings can be added between the shoulders of the worm to take the thrust and reduce the friction on any one surface.

Other objects and advantages of the invention will appear hereinafter.

Reference is to be had to the accompanying drawing, in which

Figure 1:
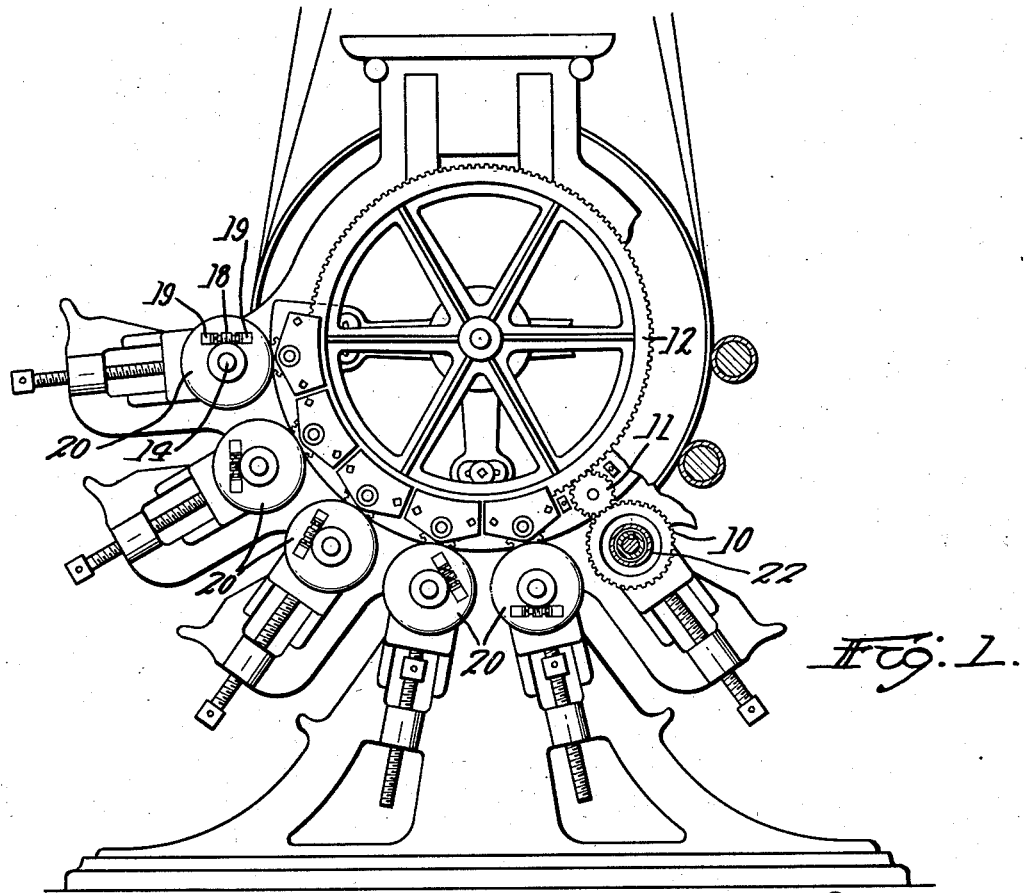
Fig. 1 is an end elevation of a color printing machine showing where the gears, which are the subject of this invention, are located thereon, and illustrating some parts in section to show interior construction.
Figures 2, 3, 4:
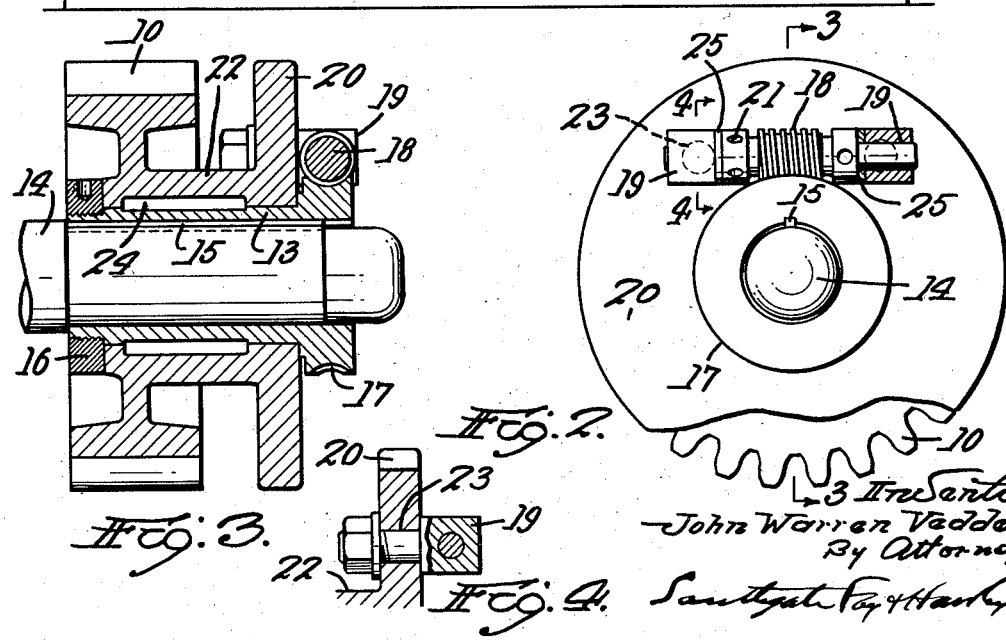
Fig. 2 is an end view of one of the gear guards with the worm adjusting mechanism therefor.
Fig. 3 is a diametrical sectional view on the line 3—3 of Fig. 2.
Fig. 4 is a sectional view on the line 4—4 of Fig. 2.

Each fitting gear 10 used on a color printing machine is arranged to mesh with a gear 11, which in turn meshes with the main gear 12 of the machine.

The color rolls are changed frequently for rolls of different diameters according to the length of the pattern to be printed. Therefore, it is necessary to take off or move back the box gear in order that this change may take place. The purpose of the invention is mainly connected with the guard that is provided for the fitting gear.

The fitting gear 10 is provided with a wide bearing for a sleeve 13 keyed to the color roll shaft 14 by a key 15. A collar 16 is used to secure the parts in proper position. On this sleeve 13 is an integral worm wheel 17 which is turned by a worm 18 arranged tangent thereto and having its bearings 19 on the gear guard 20, which will be described in full later. Friction rings 25 are provided between bearings 19 and shoulders on the worm to take the thrust and divide the friction between a plurality of surfaces.

The worm 18 has a series of radial holes 21 around it by which an operator adjusts the worm by the use of a rod entering these holes, and this is done while the fitting gear is running. The necessity of guarding the operator from the teeth of the fitting gear will be seen to be important. This arrangement also guards the gear teeth against the operating rod being thrust between them.

For the above reasons the gear is made with an integral extension 22 projecting beyond the gear teeth, at the end of which the guard 20 is integrally mounted; that is, the fitting gear 10, extension 22 and guard 20 are cast in one piece preferably. This extension 22 provides a long bearing and also provides a distance which can be used to locate a space 24 for lubricating oil between the gear and the sleeve. By making the guard 20 integral with the gear so that it rotates with it positively, the gear and guard, of course, run together at all times so that the fingers of the operator are likely to come against the guard, preventing him from getting caught in the gear.

It will be noticed that the holes 23 for the worm gear posts do not underlie the teeth of the gear 10, but are spaced a wide distance from them. The entire operating rig is located at a considerable distance from the gear teeth. This lends itself readily to the guarding of the nip of the gear.

On account of this design the number of teeth in the box gear can be reduced to a minimum not now possible, which is a very desirable feature in this type of machine and the area of the journals of the worm as well as the bearing posts can be increased both in length and diameter. There is plenty of room to locate the worm as it is mounted on the guard itself. This makes the operator's position much safer, simpler and easier. It also makes it much simpler for the operator in putting on and taking off the fitting gear.

Although I have illustrated and described only one form of the invention I am aware of the fact that modifications can be made therein by any person skilled in the art without departing from the scope of the invention as expressed in the claims. Therefore I do not wish to be limited in this respect otherwise than as set forth in the claims but what I claim is:

1. As an article of manufacture, a gear having an integral extension, an integral disc guard on the end of the extension spaced materially from the gear, and an adjusting device beyond the guard but mounted thereon at a distance away from its axis, for operation by applying a radial rod to it, whereby the guard protects the fingers of the operator of the rod from engaging the gear.

2. As an article of manufacture, a gear having a fixed extension, a relatively fixed disc guard on the end of the extension spaced materially from the gear, and an adjusting device beyond the guard but mounted thereon at a distance from its axis, for operation by applying a hand tool to it, whereby the guard protects the fingers of the operator of the tool from engaging the gear.

JOHN WARREN VEDDER.